US008903784B2

(12) United States Patent
Freeman et al.

(10) Patent No.: US 8,903,784 B2
(45) Date of Patent: Dec. 2, 2014

(54) DATA RETENTION MANAGEMENT

(75) Inventors: Roland N. Freeman, Kingston, WA (US); Depti Patel, Agoura Hills, CA (US); Luis A. Vinuelas, Scottsdale, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/593,808

(22) Filed: Aug. 24, 2012

(65) Prior Publication Data

US 2014/0059023 A1    Feb. 27, 2014

(51) Int. Cl.
*G06F 17/30* (2006.01)

(52) U.S. Cl.
USPC ............ 707/694; 707/654; 707/655; 707/825

(58) Field of Classification Search
CPC .............. G06F 17/243; G06F 17/2264; G06F 17/30188; G06Q 10/00; G06Q 10/04; G06Q 30/02
USPC ......................................... 707/654, 694, 825
See application file for complete search history.

(56) References Cited

U.S. PATENT DOCUMENTS

| | | | | |
|---|---|---|---|---|
| 6,026,414 | A * | 2/2000 | Anglin ................................. | 1/1 |
| 6,327,612 | B1 * | 12/2001 | Watanabe ...................... | 709/206 |
| 6,345,288 | B1 * | 2/2002 | Reed et al. .................... | 709/201 |
| 6,606,528 | B1 | 8/2003 | Hagmeier et al. | |
| 7,580,950 | B2 * | 8/2009 | Kavuri et al. ......................... | 1/1 |
| 8,375,008 | B1 * | 2/2013 | Gomes .......................... | 707/694 |
| 2005/0033755 | A1 | 2/2005 | Gokhale | |
| 2010/0332990 | A1 * | 12/2010 | Prahlad et al. ................ | 715/735 |
| 2011/0093672 | A1 * | 4/2011 | Gokhale et al. ............... | 711/159 |
| 2011/0218995 | A1 * | 9/2011 | Ayars et al. .................... | 707/737 |
| 2011/0238650 | A1 * | 9/2011 | Jenkins et al. ................ | 707/706 |
| 2011/0276540 | A1 * | 11/2011 | Stakutis et al. ................ | 707/662 |
| 2012/0030181 | A1 * | 2/2012 | Adhiraju et al. .............. | 707/661 |
| 2012/0084263 | A1 * | 4/2012 | Gosnell ......................... | 707/667 |
| 2012/0158669 | A1 * | 6/2012 | Morsi et al. ................... | 707/689 |
| 2012/0210088 | A1 * | 8/2012 | Iizuka ............................ | 711/166 |

FOREIGN PATENT DOCUMENTS

| | | |
|---|---|---|
| WO | 03027891 A1 | 4/2003 |
| WO | 2010114855 A1 | 10/2010 |

OTHER PUBLICATIONS

European Search Report (ESR) dated Nov. 11, 2013.

* cited by examiner

*Primary Examiner* — Hosain Alam
*Assistant Examiner* — Ahmed Abraham
(74) *Attorney, Agent, or Firm* — Toler Law Group, PC

(57) ABSTRACT

Systems, methods, and computer program products manage retention of data associated with a business record are described herein. In one embodiment, a computer-based system to manage retention of data associated with a business record comprises at least one processor and logic instructions stored in a tangible computer readable medium which, when executed by the at least one processor, configure the at least one processor to determine whether the business record has reached a record retention threshold, and in response to a determination that a business record has reached the record retention threshold to separate a business record into a plurality of data elements, wherein the data elements have at least one defined retention policy associated therewith, determine a selected storage location for each of the plurality of data elements based on the at least one defined retention policy and store each of the plurality of data elements in the selected storage location.

16 Claims, 7 Drawing Sheets

DATA RETENTION MANAGEMENT

BACKGROUND

The subject matter described herein relates to electronic computing, and more particularly to systems, methods, and computer program products to manage data retention in complex organizations.

Large organizations such as businesses, governments, and other institutions commonly generate volumes of data in the process of their operations. The data may be organized into business records which comprise a plurality of data elements. The business records and their constituent data elements may be subject to one or more data retention policies. Accordingly, systems, methods, and computer program products manage data archival processes in complex organizations may find utility.

SUMMARY

Embodiments of systems and methods in accordance with the present disclosure may manage retention of data associated with business records in a complex environment. In one embodiment, a computer-based system to manage retention of data associated with a business record comprises at least one processor and logic instructions stored in a tangible computer readable medium which, when executed by the at least one processor, configure the at least one processor to determine whether the business record has reached a record retention threshold, and in response to a determination that a business record has reached the record retention threshold, to separate a business record into a plurality of data elements, wherein the data elements have at least one defined retention policy associated therewith, determine a selected storage location for each of the plurality of data elements based on the at least one defined retention policy, and store each of the plurality of data elements in the selected storage location.

In another embodiment, a computer based method to manage retention of data associated with a business record comprises determining whether the business record has reached a record retention threshold, and in response to a determination that a business record has reached the record retention threshold, separating the business record into a plurality of data elements, wherein the data elements have at least one defined retention policy associated therewith, determining a selected storage location for each of the plurality of data elements based on the at least one defined retention policy, and storing each of the plurality of data elements in the selected storage location.

In another embodiment, a computer program product comprises first logic instructions stored in a tangible computer readable medium which, when executed by a processor, configure the processor to manage retention of data associated with a business record by performing operations, comprising determining whether the business record has reached a record retention threshold, and in response to a determination that a business record has reached the record retention threshold, separating the business record into a plurality of data elements, wherein the data elements have at least one defined retention policy associated therewith, determining a selected storage location for each of the plurality of data elements based on the at least one defined retention policy, and storing each of the plurality of data elements in the selected storage location.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Embodiments of methods and systems in accordance with the teachings of the present disclosure are described in detail below with reference to the following drawings.

DETAILED DESCRIPTION

Systems, methods, and computer program products to manage retention of data associated with business records are described herein. Some embodiments may be implemented in a complex environment such as a corporate network, a university, or a government agency network. Business records may comprise a plurality of data elements. Each business record and its constituent data elements may be subject to one or more retention policies which govern, for example, a time duration for which the record must be retained and may specify other data storage requirements such as redundancy requirements. As described in detail below, in some embodiments a computer-based system monitors business records and their constituent data elements to determine whether the records have reached a record retention threshold. When such a threshold is reached the business record and/or its constituent data may be stored in accordance with a predetermined data storage protocol applicable to the data record.

Specific details of certain embodiments are set forth in the following description and in FIGS. 1-7 to provide a thorough understanding of such embodiments. One skilled in the art will understand, however, that alternate embodiments may be practiced without several of the details described in the following description.

Figure 1:
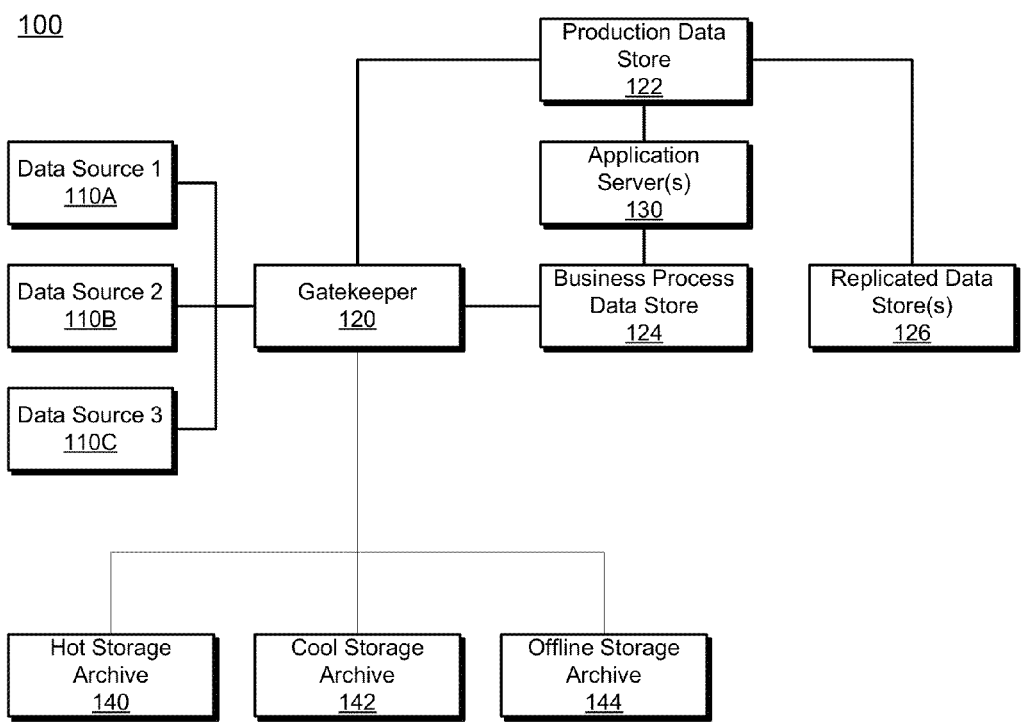
FIG. 1 is a schematic illustrations of a networked computing to manage data retention in complex organizations, according to embodiments.

FIG. 1 is a schematic illustrations of a networked computing environment in which a data governance archival pattern may be implemented, according to embodiments. Referring to FIG. 1, computing environment 100 may comprise one or more data sources 110A, 110B, 110C, which may be referred to collectively herein by reference numeral 110. Data sources 110 may comprise databases or file systems which may be internal to computing environment 100 or may be external to computing environment 100 and coupled thereto by a suitable communication link. Data sources 110 may be coupled to a gatekeeper 120, which, in turn is coupled to a production data store 122, a business process data store 124, and to a hot storage archive 140, a cool storage archive 142 and to an offline storage archive 144.

One or more application servers 130 may utilize data from the production data store 122 and the business process data store 142 in the course of executing one or more applications. The particular function of the application(s) implemented by application server(s) 130 are not critical. By way of example, the applications may include inventory management, business operations, publishing operations, manufacturing operations, or the like. Further, one or more replications of the production data store may be stored in replicated data stores 126. For example, replicated data stores 126 may be embodied as one or more mirror sites.

The various elements depicted in FIG. 1 may be comprise of one or more computer-based devices and associated computer-readable storage media and may be communicatively coupled by a suitable communication link. For example, the various elements may be connected by one or more communication networks.

Figure 2:
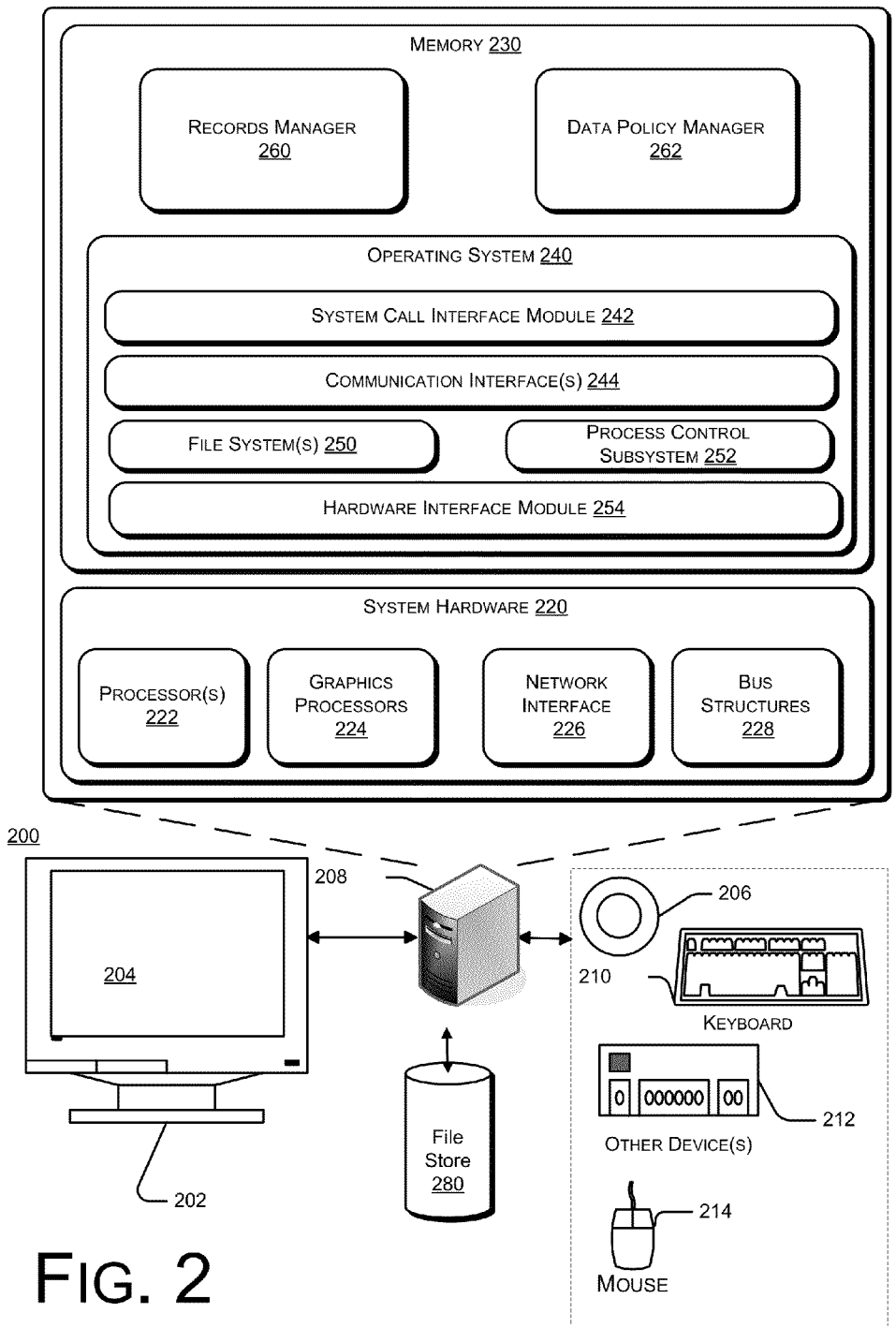
FIG. 2 is a schematic illustration of a computing device which may be adapted to manage data retention in complex organizations in accordance with some embodiments.

In some embodiments the gatekeeper 120 depicted in FIG. 1 may be implemented in a computer system environment. FIG. 2 is a schematic illustration of a computing system environment 200 which may be adapted to implement the gatekeeper 120 in accordance with some embodiments. In one embodiment, system 200 includes a computing device 208 and one or more accompanying input/output devices including a display 202 having a screen 204, one or more speakers 206, a keyboard 210, one or more other I/O device(s) 212, and a mouse 214. The other I/O device(s) 212 may include a touch screen, a voice-activated input device, a track ball, and any other device that allows the system 200 to receive input from a user.

The computing device 208 includes system hardware 220 and memory 230, which may be implemented as random access memory and/or read-only memory. A file store 280 may be communicatively coupled to computing device 208. File store 280 may be internal to computing device 208 such as, e.g., one or more hard drives, CD-ROM drives, DVD-ROM drives, or other types of storage devices. File store 280 may also be external to computer 208 such as, e.g., one or more external hard drives, network attached storage, or a separate storage network.

System hardware 220 may include one or more processors 222, a graphics processor(s) 224, network interfaces 226, and bus structures 228. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 224 may function as adjunct processors that manage graphics and/or video operations. Graphics processor(s) 224 may be integrated onto the motherboard of computing system 200 or may be coupled via an expansion slot on the motherboard.

In one embodiment, network interface 226 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 228 connect various components of system hardware 228. In one embodiment, bus structures 228 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 230 may include an operating system 240 for managing operations of computing device 208. In one embodiment, operating system 240 includes a hardware interface module 254 that provides an interface to system hardware 220. In addition, operating system 240 may include a file system 250 that manages files used in the operation of computing device 208 and a process control subsystem 252 that manages processes executing on computing device 208.

Operating system 240 may include (or manage) one or more communication interfaces that may operate in conjunction with system hardware 220 to transceive data packets and/or data streams from a remote source. Operating system 240 may further include a system call interface module 242 that provides an interface between the operating system 240 and one or more application modules resident in memory 230. Operating system 240 may be embodied as a Windows® brand operating system or as a UNIX operating system or any derivative thereof (e.g., Linux, Solaris, etc.), or other operating systems.

In various embodiments, the computing device 208 may be embodied as a computer system such as a personal computer, a laptop computer, a server, or another computing device.

In one embodiment, memory 230 includes a records manager 260 and a data policy manager 262. In some embodiments, the records manager 260 and the data policy manager 262 be embodied as logic instructions stored in a tangible, computer-readable medium which, when executed, by the processor(s) 222, configure the processor(s) 222 to implement the operations depicted in FIGS. 4-8 to implement a data archival governance policy to business records and their constituent data records. In brief, the records manager 260 and the data policy manager cooperate 262 to apply retention requirements to business records and their constituent data elements in order to manage the retention of the data. In some embodiments data may be moved successively from production storage to "hot" storage, to "cool" storage, to offline storage, and eventually is deleted.

Figure 3:
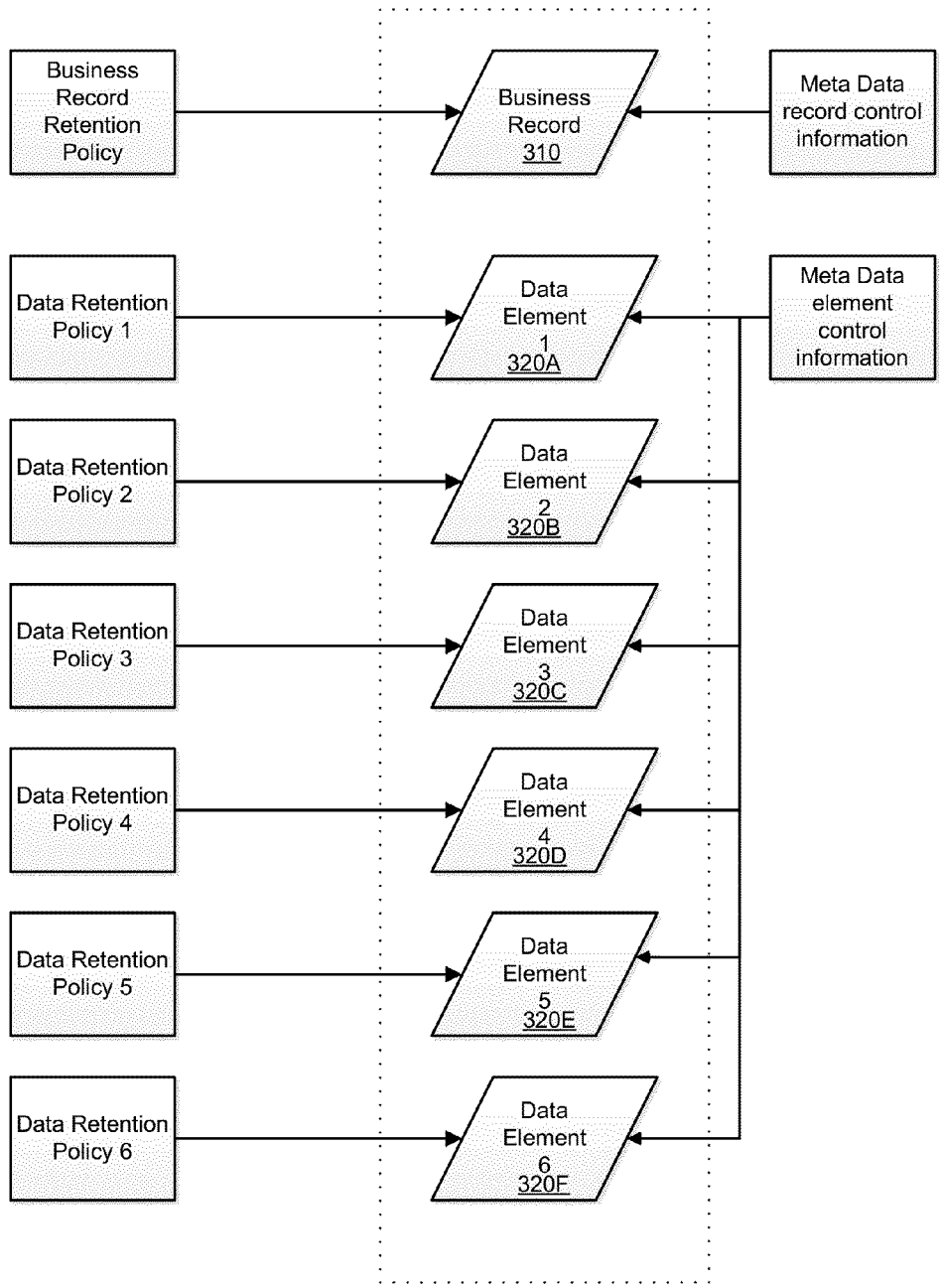
FIG. 3 is a schematic illustration of a business record and constituent data elements and retention policies according to embodiments.

FIG. 3 is a schematic illustration of a business record and constituent data elements and retention policies according to embodiments. By way of example, a business record 310 may comprise a plurality of constituent data elements, identified in FIG. 3 as data elements 320A, 320B, 320C, 320D, 320E, and 320F, which may be referred to collectively by reference numeral 320.

Each business record 310 may be subject to one or more business record retention policies. In addition, each of the data elements 320 may be subject to one or more data retention policies. By way of example, the retention policies may originate from a government retention requirement, a department of defense retention requirement, a customer retention requirement, a business retention requirement, or a legal retention requirement, e.g., records retention for litigation purposes. Thus, a single business record and each data element thereof may have multiple different applicable retention requirements. In some embodiments the gatekeeper 120 implements operations to manage retention of business records 310 and data records 320 in accordance with the various retention policies applied to the business record 310 and its constituent data elements 320.

Figure 4:
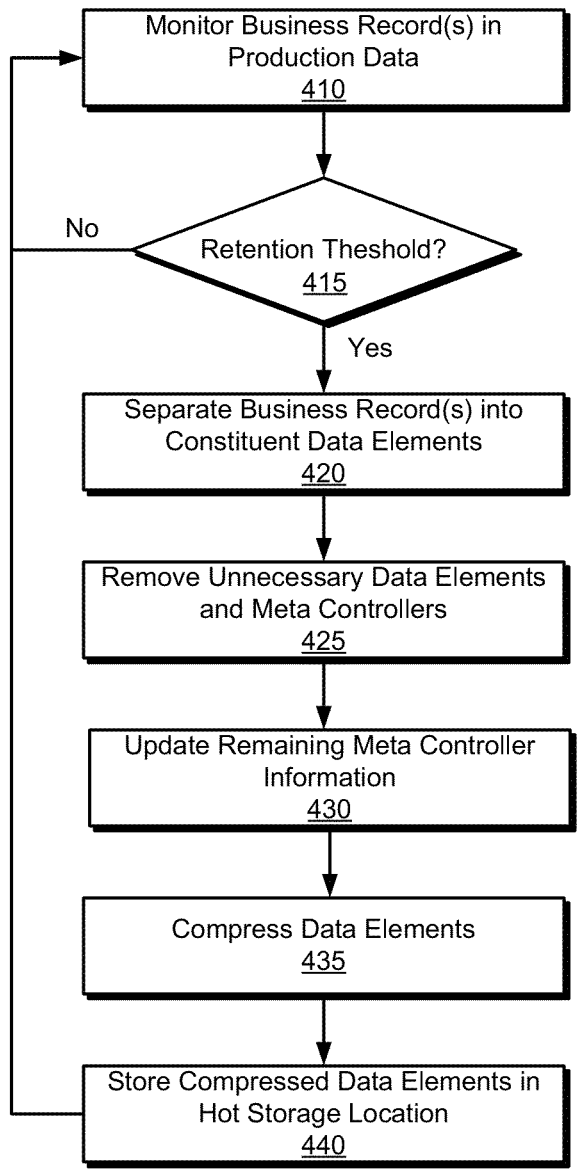
FIGS. 4-8 are flow charts illustrating operations in a method to manage, according to embodiments.

Referring first to FIG. 4, in some embodiments the records manager 260 monitors business records in the production data store 122 (operation 510). At operation 415 the records manager invokes the data policy manager 262 to determine whether a given business record has met or exceeded a retention threshold. In some embodiments the data policy manager 262 applies retention policies to business records and/or data elements and either flags or deletes records that meet retention policy thresholds.

Figure 8:
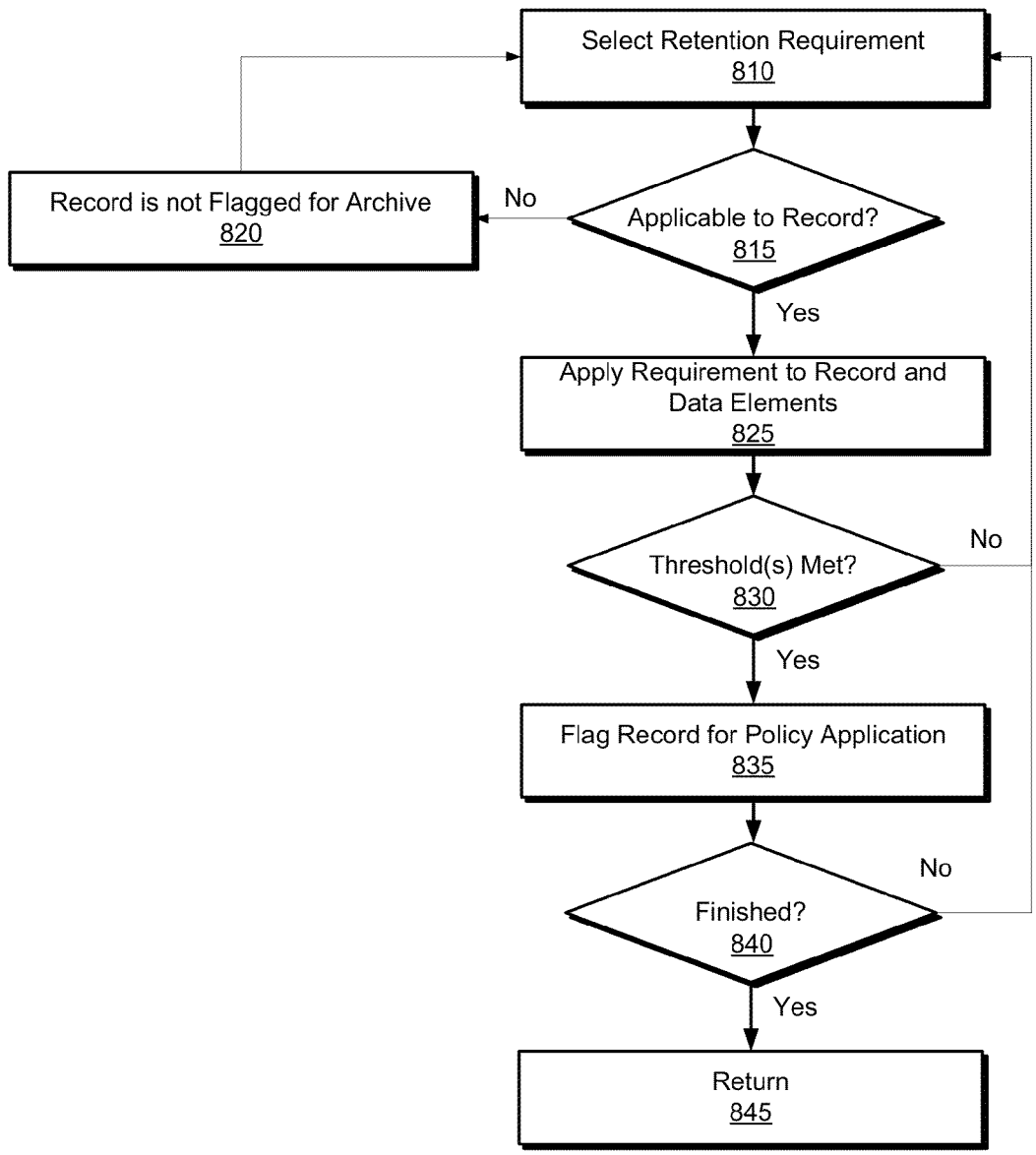

Operations implemented by the data policy manager 262 are depicted in FIG. 8. Referring to FIG. 8, at operation 810 a first retention requirement is selected. As described above, data may be subject to multiple data retention requirements which may be imposed by governments, customers, or other entities. At operation 810 a first retention requirement is selected. At operation 815 it is determined whether the data retention requirement applies to the record. By way of example, in some embodiments a logical association may be established between retention requirements and business records and/or their constituent data elements. If, at operation 815 the data retention requirement does not apply to the record then control passes to operation 820 and the record is not flagged for archiving based on that retention requirement. Control then passes back to operation 810 and the next retention requirement is selected.

By contrast, if at operation 815 the retention requirement is applicable to the record then control passes to operation then control passes to operation 825 and the retention requirement is applied to the record and to its constituent data element. By way of example, the retention requirement may impose one or more time-based retention thresholds or other thresholds on the record. If, at operation 830 the retention requirement thresholds are not met then control passes back to operation 810 and the next retention requirement is evaluated. By contrast, if at operation 830 the retention requirement condition(s) are met then control passes to operation 835 and the record is flagged for policy application.

If, at operation 840, there are additional retention requirements to evaluate then control passes back to operation 810 and the process continues to evaluate the next retention requirement. By contrast, if at operation 840 there are no additional retention requirement to evaluate then control passes to operation 845 and control returns from the data policy manager 262 to the records manager 260.

Referring back to FIG. 4, if at operation 415 the record did not meet or exceed any thresholds then control passes back to operation 410 and the records manager 260 continues to monitor the business records in the production data. By contrast, if at operation 415 the record met or exceeded one or more of the thresholds then control passes to operation 420 and the business record is separated into its constituent data elements. At operation 425 unnecessary data elements and meta controllers are removed from the business record. By way of example, some data elements may not require archival storage and may be removed. At operation 430 the remaining meta controller information is updated.

At operation 435 the remaining data elements are compressed. In some embodiments the data elements are compressed in accordance with a first defined compression ratio. At operation 440 the compressed data elements are stored in a "hot" archival storage location. As used herein, the term "hot" archival storage location refers to a storage location that is similar to the production storage environment and the data elements and or records are accessible to a requesting environment within minutes. By way of example, referring to FIG. 1, the compressed data elements may be stored in hot archival storage 140. Control then passes back to operation 410 and the records manger 260 continues to monitor business records in the production data store 122.

Figure 5:
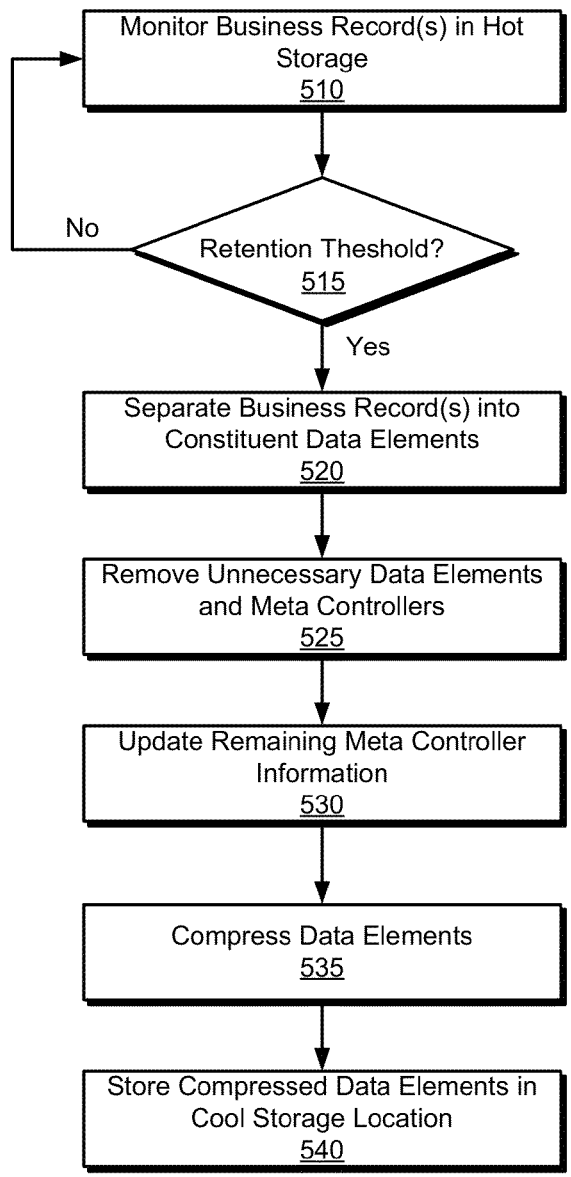

In some embodiments the records manager 260 may also monitor business records stored in the hot storage archive 140. Referring to FIG. 5, in some embodiments the records manager 260 monitors business records in the production data store 122 (operation 510). At operation 515 the records manager invokes the data policy manager 262 to determine whether a given business record has met or exceeded a retention threshold. In some embodiments the data policy manager 262 applies retention policies to business records and/or data elements and either flags or deletes records that meet retention policy thresholds, as described with reference to FIG. 8, above.

If at operation 515 the record(s) in the hot storage archive 140 did not meet or exceed any thresholds then control passes back to operation 510 and the records manager 260 continues to monitor the business records in the hot storage archive 140. By contrast, if at operation 515 one or more retention thresholds are met or exceeded one or more of the thresholds then control passes to operation 520 and the business record is separated into its constituent data elements. At operation 525 unnecessary data elements and meta controllers are removed from the business record. By way of example, some data elements may not require archival storage and may be removed. At operation 530 the remaining meta controller information is updated.

At operation 535 the remaining data elements are compressed. In some embodiments the data elements are compressed in accordance with a second defined compression ratio. At operation 540 the compressed data elements are stored in a "cool" archival storage location. As used herein, the term "cool" archival storage location refers to a storage location that is Accessible via automated methods and data can be retrieved within hours of a given request. By way of example, referring to FIG. 1, the compressed data elements may be stored in hot archival storage 140. Control then passes back to operation 410 and the records manger 260 continues to monitor business records in the production data store 122.

Figure 6:
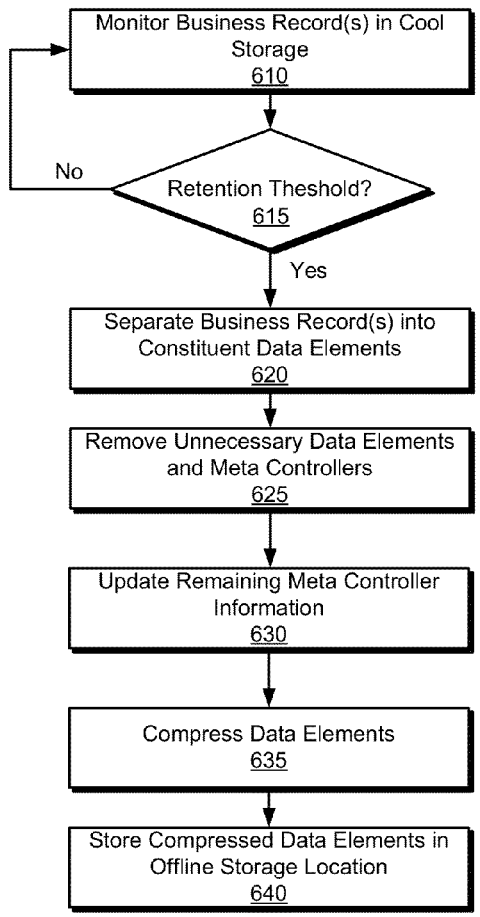

In some embodiments the records manager 260 may also monitor business records stored in the cool storage archive 142. Referring to FIG. 6, in some embodiments the records manager 260 monitors business records in the cool storage archive 142 (operation 610). At operation 615 the records manager invokes the data policy manager 262 to determine whether a given business record has met or exceeded a retention threshold. In some embodiments the data policy manager 262 applies retention policies to business records and/or data elements and either flags or deletes records that meet retention policy thresholds, as described with reference to FIG. 8, above.

If at operation 615 the record(s) in the hot storage archive 140 did not meet or exceed any thresholds then control passes back to operation 610 and the records manager 260 continues to monitor the business records in the hot storage archive 140. By contrast, if at operation 615 a retention threshold is met or exceeded one then control passes to operation 620 and the business record is separated into its constituent data elements. At operation 625 unnecessary data elements and meta controllers are removed from the business record. By way of example, some data elements may not require archival storage and may be removed. At operation 630 the remaining meta controller information is updated.

At operation 635 the remaining data elements are compressed. In some embodiments the data elements are compressed in accordance with a third defined compression ratio which is higher than the previous defined compression ratio. At operation 640 the compressed data elements are stored in an offline archival storage location. As used herein, the term "offline" archival storage location refers to a storage location that is can be either an electronic or media based format that will usually require a manual recovery method to put online for purposes of auditing or recreating the original data set. By way of example, referring to FIG. 1, the compressed data elements may be stored in an offline storage archive 144. Control then passes back to operation 610 and the records manger 260 continues to monitor business records in the cool storage archive 140.

Figure 7:
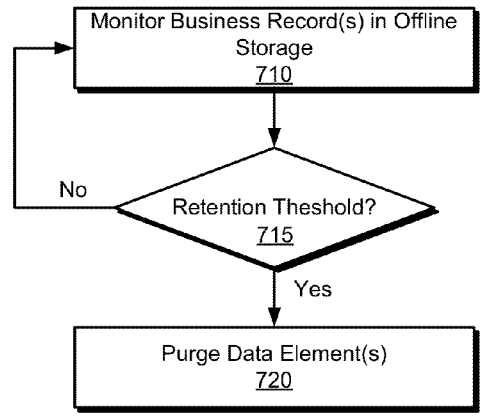

In some embodiments the records manager 260 may also monitor business records stored in the offline storage archive 144. Referring to FIG. 7, in some embodiments the records manager 260 monitors business records in the offline storage archive 144 (operation 710). At operation 715 the records manager invokes the data policy manager 262 to determine whether a given business record has met or exceeded a retention threshold. In some embodiments the data policy manager 262 applies retention policies to business records and/or data elements and either flags or deletes records that meet retention policy thresholds, as described with reference to FIG. 8, above.

If at operation 715 the record(s) in the offline storage archive 144 did not meet or exceed any thresholds then control passes back to operation 610 and the records manager 260 continues to monitor the business records in the hot storage archive 140. By contrast, if at operation 715 one or more records in the offline storage archive 144 met or exceeded one or more of the thresholds then control passes to operation 720 and the data elements associated with the business record are deleted.

Thus, described herein is a computer based system and method to manage retention of data associated with business records in a complex environment. In brief, a computer-based system monitors business records and their constituent data elements stored in a production data store and applies retention policies thereto. Business records and constituent data elements which satisfy retention thresholds may be compressed and moved to successively more remote storage archives.

In the foregoing discussion, specific implementations of exemplary processes have been described, however, it should be understood that in alternate implementation, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system comprising:
   at least one processor;
   a memory storing instructions that, when executed by the at least one processor, cause the at least one processor to:
   determine whether a first business record has reached a first record retention threshold;
   in response to determining that the first business record has reached the first record retention threshold, separate the first business record into a plurality of first data elements, wherein each of the plurality of first data elements has a respective plurality of first retention policies associated therewith;
   automatically select at least one first data element of the plurality of first data elements, wherein the at least one first data element is unnecessary to maintain integrity of the first business record and wherein the plurality of first data elements includes the at least one first data element and a remaining plurality of first data elements;
   remove the at least one first data element from the first business record;
   compress the remaining plurality of first data elements in accordance with a first compression ratio;
   determine a first respective selected storage location for each of the remaining plurality of first data elements based on the respective plurality of first retention policies associated therewith, wherein the first respective selected storage location includes a hot storage system; and
   store each of the remaining plurality of first data elements in the first respective selected storage location.

2. The system of claim 1, wherein a first retention policy is associated with a first data element of the plurality of first data elements and a second retention policy is associated with a second data element of the plurality of first data elements, and wherein the first retention policy is different from the second retention policy.

3. The system of claim 1, wherein the instructions, when executed by the at least one processor, further cause the at least one processor to:
   determine whether a second business record has reached a second record retention threshold;
   in response to determining that the second business record has reached the second record retention threshold, separate the second business record into a plurality of second data elements, wherein each of the plurality of second data elements has a respective plurality of second retention policies associated therewith;
   automatically select at least one second data element of the plurality of second data elements, wherein the at least one second data element is unnecessary to maintain integrity of the second business record, and wherein the plurality of second data elements includes the at least one second data element and a remaining plurality of second data elements;
   remove the at least one second data element from the second business record;
   compress the remaining plurality of second data elements in accordance with a second compression ratio;
   determine a second respective selected storage location for each of the remaining plurality of second data elements based on the respective plurality of second retention policies associated therewith, wherein the second respective selected storage location includes a cool storage system; and store each of the remaining plurality of second data elements in the second respective selected storage location.

4. The system of claim 3, wherein the instructions, when executed by the at least one processor, further cause the at least one processor to:
  determine whether a third business record has reached a third record retention threshold;
  in response to determining that the third business record has reached the third record retention threshold, separate the third business record into a plurality of third data elements, wherein each of the plurality of third data elements has a respective plurality of third retention policies associated therewith;
  automatically select at least one third data element of the plurality of third data elements, wherein the at least one third data element is unnecessary to maintain integrity of the third business record, and wherein the plurality of third data elements includes the at least one third data element and a remaining plurality of third data elements;
  remove the at least one third data element from the third business record;
  compress the remaining plurality of third data elements in accordance with a third compression ratio;
  determine a third respective selected storage location for each of the remaining plurality of third data elements based on the respective plurality of third retention policies associated therewith, wherein the third respective selected storage location includes a cold storage system; and
  store each of the remaining plurality of third data elements in the third respective selected storage location.

5. The system of claim 4, wherein the instructions, when executed by the at least one processor, further cause the at least one processor to:
  determine whether a fourth business record has reached a fourth record retention threshold; and
  in response to determining that the fourth business record has reached the fourth record retention threshold, delete the fourth business record.

6. A method comprising:
  determining, at a device, whether a first business record has reached a first record retention threshold by applying a retention policy to the first business record;
  in response to determining that the first business record has reached the first record retention threshold, separating, at the device, the first business record into a plurality of first data elements, wherein each of the plurality of first data elements has a respective plurality of first retention policies associated therewith;
  automatically selecting, at the device, at least one first data element of the plurality of first data elements, wherein the at least one first data element is unnecessary to maintain integrity of the first business record, and wherein the plurality of first data elements includes the at least one first data element and a remaining plurality of first data elements;
  removing, at the device, the at least one first data element from the first business record;
  determining, at the device, a first respective selected storage location for each of the remaining plurality of first data elements based on the respective plurality of first retention policies associated therewith; and
  storing, at the device, each of the remaining plurality of first data elements in the first respective selected storage location.

7. The method of claim 6, further comprising compressing the remaining plurality of first data elements in accordance with a first compression ratio, wherein the first respective selected storage location includes a hot storage system.

8. The method of claim 6, wherein the first business record includes inventory management data, publishing operations data, manufacturing operations data, or a combination thereof.

9. The method of claim 6, further comprising purging one or more data elements of the remaining plurality of first data elements.

10. The method of claim 7, further comprising:
  determining, at the device, whether a second business record has reached a second record retention threshold by applying the retention policy to the second business record;
  in response to determining that the second business record has reached the second record retention threshold, separating, at the device, the second business record into a plurality of second data elements, wherein each of the plurality of second data elements has a respective plurality of second retention policies associated therewith;
  automatically selecting, at the device, at least one second data element of the plurality of second data elements, wherein the at least one second data element is unnecessary to maintain integrity of the second business record, and wherein the plurality of second data elements includes the at least one second data element and a remaining plurality of second data elements;
  removing, at the device, the at least one second data element from the second business record;
  compressing the remaining plurality of second data elements in accordance with a second compression ratio;
  determining, at the device, a second respective selected storage location for each of the remaining plurality of second data elements based on the respective plurality of second retention policies associated therewith, wherein the second respective selected storage location includes a cool storage system; and
  storing, at the device, each of the remaining plurality of second data elements in the second respective selected storage location.

11. A computer readable storage device storing instructions that, when executed by a processor, cause the processor to perform operations comprising:
  determining whether a first business record has reached a first record retention threshold;
  in response to determining that the first business record has reached the first record retention threshold, separating the first business record into a plurality of first data elements, wherein each of the plurality the first data elements has a respective plurality of first retention policies associated therewith;
  automatically selecting at least one first data element of the plurality of first data elements, wherein the at least one first data element is unnecessary to maintain integrity of the first business record, and wherein the plurality of first data elements includes the at least one first data element and a remaining plurality of first data elements;
  removing the at least one first data element from the first business record;
  determining a first respective selected storage location for each of the remaining plurality of first data elements based on the respective plurality of first retention policies associated therewith; and
  storing each of the remaining plurality of first data elements in the first respective selected storage location.

12. The computer readable storage device of claim 11, wherein the operations further comprise applying one or more retention policies to the remaining plurality of first data elements in the first business record.

13. The computer readable storage device of claim 11, wherein the first business record is related to an inventory management application, a business operations application, a publishing operations application, a manufacturing operations application, or a combination thereof.

14. The computer readable storage device of claim 11, wherein the operations further comprise compressing the remaining plurality of first data elements in accordance with a first compression ratio, wherein the remaining plurality of first data elements is stored in a hot storage system.

15. The computer readable storage device of claim 14, wherein the operations further comprise:
 determining whether a second business record has reached a second record retention threshold;
 in response to determining that the second business record has reached the second record retention threshold, separating the second business record into a plurality of second data elements, wherein each of the plurality the second data elements has a respective plurality of second retention policies associated therewith;
 automatically selecting at least one second data element of the plurality of second data elements, wherein the at least one second data element is unnecessary to maintain integrity of the second business record, and wherein the plurality of second data elements includes the at least one second data element and a remaining plurality of second data elements;
 removing the at least one second data element from the second business record;
 compressing the remaining plurality of second data elements in accordance with a second compression ratio;
 determining a second respective selected storage location for each of the remaining plurality of second data elements based on the respective plurality of second retention policies associated therewith, wherein the second respective selected storage location includes a cool storage system; and
 storing each of the remaining plurality of second data elements in the second respective selected storage location.

16. The computer readable storage device of claim 15, wherein the operations further comprise:
 determining whether a third business record has reached a third record retention threshold;
 in response to determining that the third business record has reached the third record retention threshold, separating the third business record into a plurality of third data elements, wherein each of the plurality the third data elements has a respective plurality of third retention policies associated therewith;
 automatically selecting at least one third data element of the plurality of third data elements, wherein the at least one third data element is unnecessary to maintain integrity of the third business record, and wherein the plurality of third data elements includes the at least one third data element and a remaining plurality of third data elements;
 removing the at least one third data element from the third business record;
 compressing the remaining plurality of third data elements in accordance with a third compression ratio;
 determining a third respective selected storage location for each of the remaining plurality of third data elements based on the respective plurality of third retention policies associated therewith; and
 storing each of the remaining plurality of third data elements in the third respective selected storage location.

* * * * *